US008289365B2

(12) United States Patent
De Lind Van Wijngaarden et al.

(10) Patent No.: US 8,289,365 B2
(45) Date of Patent: Oct. 16, 2012

(54) METHOD AND APPARATUS FOR THE EFFICIENT TRANSMISSION OF MULTIMEDIA STREAMS FOR TELECONFERENCING

(75) Inventors: Adriaan J. De Lind Van Wijngaarden, New Providence, NJ (US); Bilgehan Erman, Marlboro, NJ (US); Vanita K Katkar, White House Station, NJ (US); Elissa P. Matthews, Watchung, NJ (US); Ronald L. Sharp, Clinton, NJ (US)

(73) Assignee: Alcatel Lucent, Paris (FR)

( * ) Notice: Subject to any disclaimer, the term of this patent is extended or adjusted under 35 U.S.C. 154(b) by 755 days.

(21) Appl. No.: 12/383,901

(22) Filed: Mar. 30, 2009

(65) Prior Publication Data

US 2010/0245534 A1    Sep. 30, 2010

(51) Int. Cl.
*H04N 7/14*    (2006.01)
(52) U.S. Cl. ............... 348/14.08; 348/14.03; 348/14.04; 348/14.05; 348/14.09; 709/204; 379/202.01
(58) Field of Classification Search ............... 348/14.08; 709/225, 229; 370/254
See application file for complete search history.

(56) References Cited

U.S. PATENT DOCUMENTS

| 7,379,428 B2 * | 5/2008 | Xu et al. | 370/254 |
| 7,644,167 B2 * | 1/2010 | Lee et al. | 709/229 |
| 7,827,279 B2 * | 11/2010 | Xu et al. | 709/225 |
| 8,065,725 B2 * | 11/2011 | Zheng et al. | 726/22 |

OTHER PUBLICATIONS

"Skype", from Wikipedia; published on-line at: http://en.wikipedia.org/wiki/Skype. Mar. 30, 2009, 12 pages.
"Kazaa", from Wikipedia; published on-line at: http://en.wikipedia.org/wiki/Kazaa. Mar. 25, 2009, 7 pages.
"Skype protocol", from Wikipedia, published on-ine at: http://en.wikipedia.org/wiki/Skype_protocol. Jan. 19, 2009, 6 pages.
"Peer-to-peer", from Wikipedia, published on-line at: http://en.wikipedia.org/wiki/Peer_to_peer. Mar. 29, 2009, 13 pages.
"Multicast", from Wikipedia, published on-line at: http://en.wikipedia.org/wiki/Multicast. Mar. 26, 2009, 5 pages.

* cited by examiner

*Primary Examiner* — Joseph J Nguyen
(74) *Attorney, Agent, or Firm* — Ryan, Mason & Lewis, LLP

(57) ABSTRACT

A teleconferencing system in which a teleconference controller advantageously uses information relating to the network topology layout of remote nodes which are to participate in a teleconference, and then advantageously directs the transmission of video and/or audio streams from a source node to an identified subset of the remote nodes based on the capabilities of the nodes and the network links. These nodes which initially receive the video and/or audio streams then advantageously forward the streams in turn to other nodes in their vicinity using peer-to-peer network connectivity techniques. The identification of the subset of nodes which serve as peer-to-peer forwarding nodes may be based on node activity, node service capacity, the impact on network links between the node and the requester, the distance and/or latency between the node and the requester, and the ability of the node to meet requests including video transcoding requests.

19 Claims, 3 Drawing Sheets

# METHOD AND APPARATUS FOR THE EFFICIENT TRANSMISSION OF MULTIMEDIA STREAMS FOR TELECONFERENCING

FIELD OF THE INVENTION

The present invention relates generally to the field of video and/or audio teleconferencing and more particularly to a method and apparatus for the efficient transmission of multimedia streams in video and/or audio teleconferencing applications.

BACKGROUND OF THE INVENTION

There are numerous obstacles that prohibit wide acceptance of video teleconferencing (videoconferencing). One of the key technical obstacles is the high bandwidth consumption of video streams. In a multi-site configuration, this bandwidth demand becomes most prominent at central locations such as meeting rooms to which many remote users connect. For example, in a configuration where 10 users receive video and audio feeds from a given meeting room, the video conferencing equipment at that room may have to stream 30 individual video and audio streams to remote users from (typically) three different cameras. With each stream consuming bandwidth of more than 1 Mbps, the total bandwidth use can thereby peak to more than 30 Mbps.

Multicast transmission of IP (Internet Protocol) video packets is one of the most effective solutions to the video and audio distribution problem described above. However, multicasting is only enabled and used in tightly controlled enterprise and service provider networks such as the ones used for IPTV (Internet Protocol Television) services. Other uses of multicasting are also provided via dedicated backbone multicast networks, but otherwise, multicasting capabilities are not typically available on public networks that cross multiple domains.

The majority of the existing videoconferencing systems attempt to tackle this problem by providing a high-end server with large processing power and high network input/output capabilities. These servers are typically located in environmentally controlled facilities. Obvious drawbacks of this approach include high capital and operations cost, loss of security in the case of hosted and service-based configurations where the server is located outside the company facilities, and increased but still limited capability to support a large number of videoconferencing users. In addition, these existing approaches offer limited scalability to very large teleconferencing applications.

SUMMARY OF THE INVENTION

To eliminate network traffic bottlenecks resulting from the bandwidth problem described above, the instant inventors have realized that one may take advantage of new broadband capabilities that are typically available in access networks. Namely, the instant inventors have recognized that since the bandwidth available to broadband access network subscribers, such as, for example, Digital Subscriber Line (DSL) and fiber connected users, is now much higher than 1 Mbps, peer-to-peer connectivity (i.e., user-to-user) may be advantageously employed to optimize video and/or audio stream distribution. In particular, rather than sending individual video and/or audio streams to each remote user individually, a central teleconference controller (which may, for example, be located in a given meeting room) may, in accordance with an illustrative embodiment of the present invention, make use of information relating to the network topology layout of remote nodes to advantageously direct the transmission of the video and/or audio streams from a source node to a few identified nodes based on the capabilities of the nodes and the network links. These nodes which initially receive the video and/or audio streams may then advantageously forward these streams in turn to other nodes in their vicinity.

More particularly, in accordance with an illustrative embodiment of the present invention, a method and apparatus is provided for controlling the operation of a teleconference across a telecommunications network comprising a plurality of nodes including one or more source locations and one or more remote locations, the teleconference including teleconference participants at each of said one or more source locations and at each of said one or more remote locations, the method and apparatus performed by a teleconference controller and comprising: receiving, at the teleconference controller, a request from a first one of said remote locations to deliver a media signal from one of said primary locations to said first one of said remote locations; automatically selecting, at the teleconference controller, a second one of said remote locations to serve as a peer-to-peer forwarding node for said delivery of said media signal from said first one of said source locations to said first one of said remote locations; and initiating, by the teleconference controller, a transmission of said media signal from said one of said source locations to said selected second one of said remote locations, said media signal for use by teleconference participants located at said second one of said remote locations and for further use by said selected second one of said remote locations in forwarding said media signal to said first one of said remote locations.

In addition, in accordance with another illustrative embodiment of the present invention, a method and apparatus is provided for supporting the operation of a teleconference across a telecommunications network comprising a plurality of nodes including one or more source locations and one or more remote locations, the teleconference including teleconference participants at each of said one or more source locations and at each of said one or more remote locations, the method and apparatus performed by a peer-to-peer forwarding node located at a first one of said remote locations and comprising: receiving, at said peer-to-peer forwarding node at said first one of said remote locations, a media signal from said primary location; receiving, at said peer-to-peer forwarding node at said first one of said remote locations, a request from said primary location to provide peer-to-peer forwarding of said media signal to a second one of said remote locations; and forwarding said received media signal to said second one of said remote locations.

DETAILED DESCRIPTION OF THE PREFERRED EMBODIMENTS

The peer-to-peer video and audio distribution technique in accordance with an illustrative embodiment of the present invention as described herein may be implemented in an illustrative video teleconferencing product in accordance with an illustrative embodiment of the present invention that specifically address a common meeting configuration where many individual remote users connect to a central primary meeting place (i.e., a "source" location).

There are two main components of the illustrative system architecture:

(a) a central server (i.e., control) unit that may, for example, reside in the given primary meeting place, and which directs the transmission of video and/or audio streams to the remote participants, wherein the central unit comprises a teleconference controller, as well as one or more cameras and one or more microphones; and (b) client units (which may, for example, comprise a laptop or a desktop computer) located in proximity with the remote participants to allow the remote participants to "connect" to and to participate in the meeting.

In particular, in accordance with an illustrative embodiment of the present invention, each client of the illustrative videoconferencing system may advantageously act as another possible server—i.e., as a bridge to other client units, thereby allowing one client unit to retrieve the streams from the meeting place and pass them on to other client units which are located "further out" in the network.

In accordance with certain illustrative embodiments of the present invention, the peer-to-peer video (and/or audio) distribution technique of the illustrative videoconferencing system may be advantageously based on the computation of node distribution topology on the network, as well as on the discovery of processing power of each node, and/or latency requirements such that video and audio streams are advantageously synchronized and the delay is kept low. (Note that the specific delay requirements depend on the application—highly interactive sessions require shorter latency than an uninterrupted presentation held at one site.)

Figure 1:
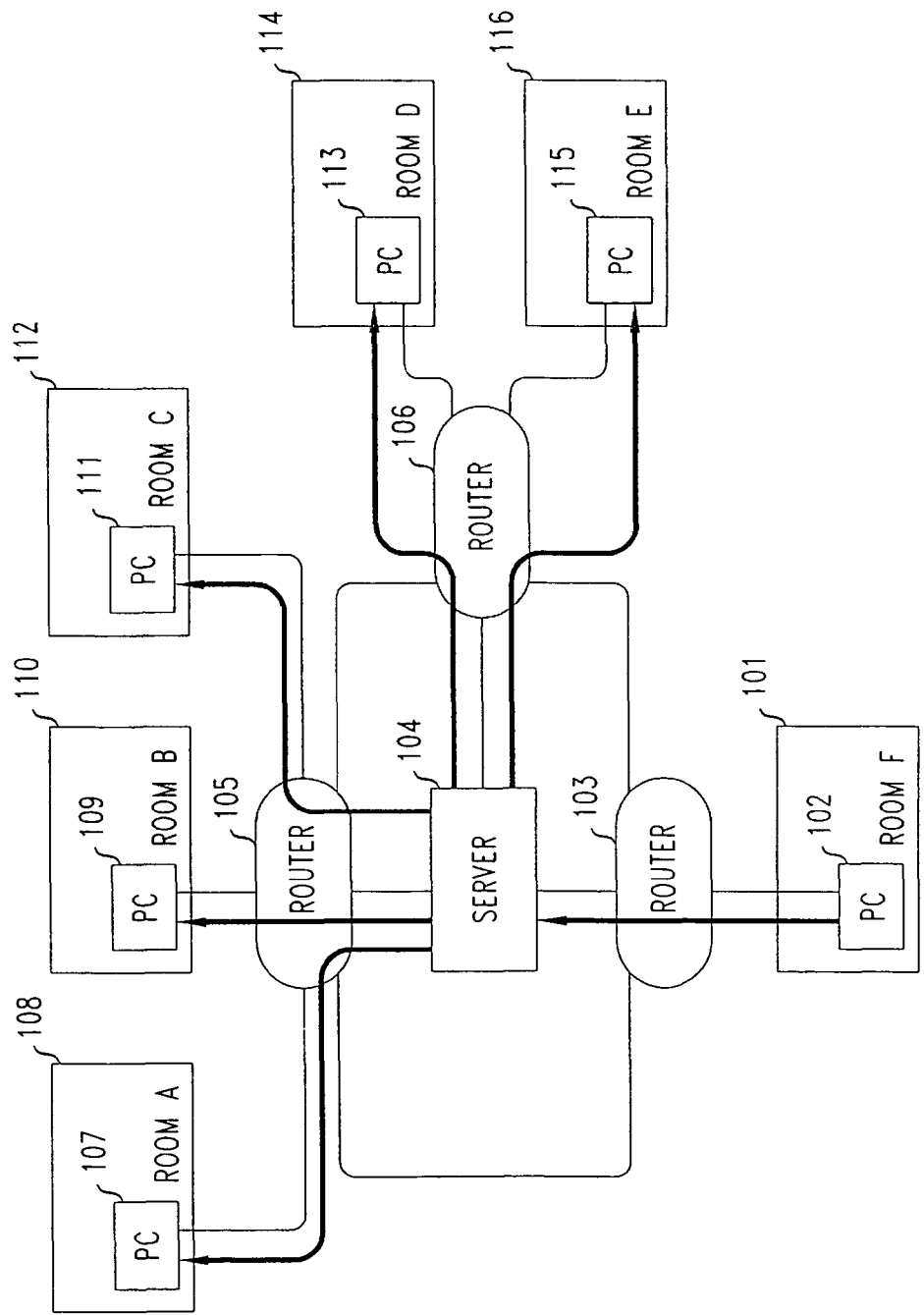
FIG. 1 shows the operation of a prior art system for performing video teleconferencing using a videoconferencing server operating in a conventional "star" network configuration.

FIG. 1 shows the operation of a prior art system for performing video teleconferencing using a videoconferencing server operating in a conventional "star" network configuration. The figure illustratively shows how real-time video and audio signal streams generated in "Room F" 101 (e.g., the main meeting room of the conference) may be sent by PC 102 (located in Room F) through router 103 to videoconferencing server 104. This conventional videoconferencing server (conceptually) occupies the center position in a "star" network configuration, and, in turn, distributes these video and audio signal streams received from "Room F" 101 (via router 103) through routers 105 and 106 to various "remote" locations—namely, to PC 107 (located in "Room A" 108), PC 109 (located in "Room B" 110) and PC 111 (located in "Room C" 112), each via router 105, as well as to PC 113 (located in "Room D" 114) and PC 115 (located in "Room E" 116), each via router 106. (By way of illustration, FIG. 1 shows interconnected components with use of single width non-directional lines, whereas the signal streams originating in "Room F" 101 and transmitted to the remote locations are shown as double width directional arrows.) Note that each of the PCs (i.e., PC 102, PC 107, PC 109, PC 111, PC 113 and PC 115) located in corresponding "rooms" shown in the figure (i.e., "Room F" 101, "Room A" 108, "Room B" 110, "Room C" 112, "Room D" 114 and "Room E" 116, respectively), may comprise any Internet-connected processing system capable of transmitting and/or receiving video and/or audio signal streams.

In the prior art video teleconferencing system which is illustratively shown in FIG. 1, videoconferencing server 104 manages and controls the operation of the teleconference, receives the video and audio streams from each of the participating PCs (including PC 102 in "Room F" 101 as explicitly shown in the figure), and distributes the received video and audio streams directly (i.e., through network routers only) to all of the other participants in the teleconference. Illustratively, "Room F" 101 may be located in a first geographical area "served" by router 103, "Room A" 108, "Room B" 110 and "Room C" 112 may be located in a second geographical area "served" by router 105, and "room D" 114 and "Room E" 116 may be located in a third geographical area "served" by router 106.

Figure 2:
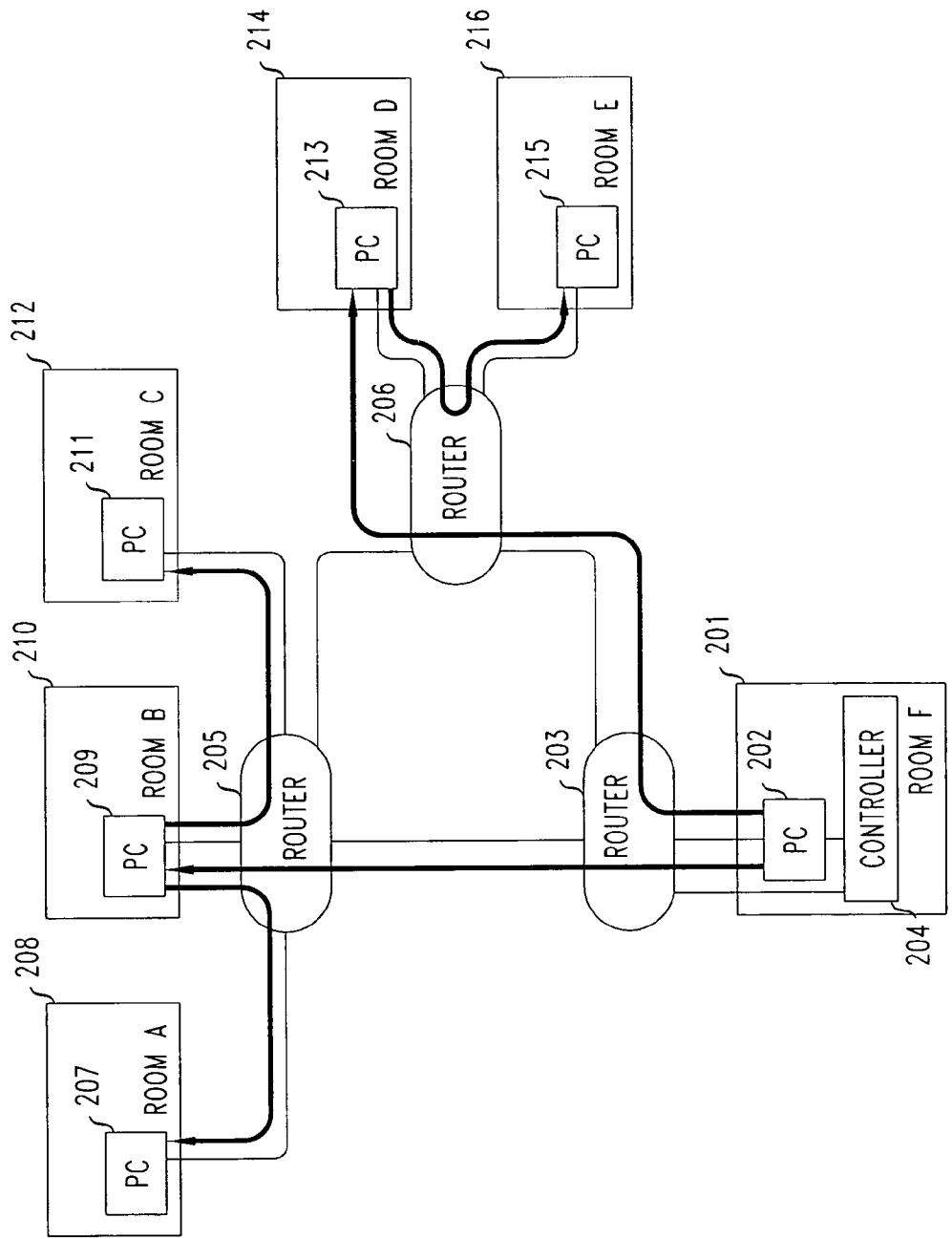
FIG. 2 shows the operation of an illustrative system for performing video teleconferencing using peer-to-peer network connectivity techniques in accordance with an illustrative embodiment of the present invention.

FIG. 2 shows the operation of an illustrative system for performing video teleconferencing using peer-to-peer network connectivity techniques in accordance with an illustrative embodiment of the present invention. Specifically, the illustrative system shown in the figure advantageously makes use of peer-to-peer (i.e., user-to-user) network connectivity to advantageously reduce the overall network bandwidth requirements as compared to prior art techniques (such as that employed by the system shown in FIG. 1). Note in particular, that in the illustrative system of FIG. 2, there is advantageously no "central" server operating at the "center" of a "star" network configuration. That is, in accordance with certain illustrative embodiments of the present invention, video and/or audio streams may be advantageously sent directly from a source location "room" of the teleconference to other participating "rooms" of the teleconference, which will then, in turn, advantageously forward these streams on to other participating "rooms" of the teleconference, thus advantageously providing peer-to-peer videoconferencing signal distribution.

Specifically, the illustrative system of FIG. 2 shows teleconference controller 204 which may, for example, be physically located in "Room F" 201 (i.e., the "main" meeting room of the conference, from which the video and/or audio signal streams whose distribution is shown herein originate). In particular, teleconference controller 204 advantageously manages and controls the operation of the teleconference by directing the transmission of real-time video and/or audio signal streams generated in "Room F" 201 directly (through the necessary routers) to a selected subset of the "remote" locations participating in the teleconference. Then, in accordance with the illustrative embodiment of the present invention, one or more of these selected "remote" locations, in turn, transmit the real-time video and/or audio signal streams to other "remote" locations which are participating in the teleconference. These selected nodes will be referred to herein as "peer-to-peer forwarding nodes."

More particularly, the figure shows teleconference controller 204 directing PC 202, which is located in "Room F" 201, to transmit real-time video and/or audio signal streams generated therein (i.e., in "Room F" 201) through router 203 and subsequently through router 205 to PC 209 (located in "Room B" 210). Similarly, teleconference controller 204 directs PC 202 (located in "Room F" 201) to transmit the real-time video and/or audio signal streams generated therein through router 203 and subsequently through router 206 to PC 213 (located in "Room D" 214). (As in the case of the illustration of FIG. 1, FIG. 2 shows interconnected components with use of single width non-directional lines, whereas the signal streams originating in "Room F" 201 and transmitted to the remote locations are shown as double width directional arrows.)

Then, in accordance with the illustrative embodiment of the present invention shown in FIG. 2, each of the peer-to-peer forwarding nodes advantageously forwards the received signal streams to other nodes in their geographic vicinity. In particular, PC 209 (located in "Room B" 210) advantageously forwards the received video and/or audio signal streams both to PC 207 (located in "Room A" 208) and to PC 211 (located in "Room C" 212), using peer-to-peer network connectivity techniques. Similarly, PC 213 (located in "Room D" 214) advantageously forwards the received video and/or audio signal streams to PC 215 (located in "Room E" 216), also using peer-to-peer network connectivity techniques. Illustratively, as in the case of FIG. 1, "Room F" 201 may be located in a first geographical area "served" by router 203, "Room A" 208, "Room B" 210 and "Room C" 212 may be located in a second geographical area "served" by router 205, and "room D" 214 and "Room E" 216 may be located in a third geographical area "served" by router 206.

Note that in accordance with the illustrative embodiment of the present invention, shown in FIG. 2, teleconference controller 204 is advantageously physically located in the meeting room (i.e., "Room F" 201) which is providing the video and/or audio source material which is to be transmitted to the remote locations. In accordance with other illustrative embodiments of the present invention, however, a teleconference controller may be physically placed in other locations. For example, a teleconference controller may be physically located either in one of the remote locations or elsewhere within the telecommunications network itself.

Moreover, in accordance with certain illustrative embodiments of the present invention, more than one teleconference controller may be provided. In one such illustrative embodiment of the present invention, for example, there may be a "primary" teleconference controller which typically performs the tasks of controlling the teleconference, while any additional teleconference controller(s) may serve as a "backup" in case there is a failure of the primary controller. In other such illustrative embodiments of the present invention, the above-described functionality of the teleconference controller may be shared between the multiple provided teleconference controllers, in any of a number of ways which will be obvious to those of ordinary skill in the art.

Also, although the above-disclosed embodiments describe a videoconferencing environment having a single primary "meeting room" and one or more other "remote" rooms, wherein the video and/or audio signal streams are transmitted from the primary "meeting room" to the one or more "remote rooms" only, in accordance with other illustrative embodiments of the present invention two or more rooms (which may be geographically disparate) may serve as separate "meeting rooms" from which video and/or audio streams are transmitted to the "remote" rooms (including. for example, to the other "meeting rooms") which are participating in the teleconference. (In fact, in accordance with one illustrative embodiment of the present invention, all of the rooms participating in the teleconference may actually be "meeting rooms" which provide video and/or audio signal streams to all of the other participating rooms.) In such a case (i.e., where there is more than one room from which video and/or audio signals are transmitted), each of the rooms other than the given transmitting room (i.e., both the "remote" rooms as well as the other "meeting rooms") advantageously act as a "remote" room for the purposes of the transmission of the given video and/or audio signal stream. Therefore, as used herein, the term "remote" room is used only in the context of being "remote" with respect to one specific "meeting room" from which video and/or audio signals are transmitted therefrom.

For example, in accordance with one such illustrative embodiment of the present invention, a single one of these multiple rooms may have a teleconference controller associated therewith, wherein the single teleconference controller provides the control functions for transmitting various video and/or audio streams from multiple originating locations ("meeting rooms"). Thus, in such a case, both "meeting rooms" and "remote rooms" may be receiving video and/or audio streams from one or more other rooms.

Moreover, in accordance with certain illustrative embodiments of the present invention, when there are multiple sources of video and/or audio signals (provided by multiple "meeting rooms"), an illustrative teleconference controller in accordance with such embodiments may advantageously control a process of mixing, merging and/or combining two or more of the video signals (e.g., in a "thumbnail" pattern having multiple video "windows") and/or of the audio signals (e.g., via audio signal mixing) prior to these resultant video and/or audio signals being distributed to the remote rooms. Alternatively, in accordance with other illustrative embodiments of the present invention, peer-to-peer forwarding nodes may advantageously provide such a mixing/merging of two or more of the video signals (e.g., in a "thumbnail" pattern having multiple video "windows") and/or of the audio signals (e.g., via audio signal mixing) received from multiple sources ("meeting rooms"), prior to forwarding these on to another remote node.

In addition, in accordance with certain illustrative embodiments of the present invention, telecommunications network nodes other than those located at "remote" rooms (i.e., network nodes that may not be associated with teleconference participants) may also be employed as peer-to-peer forwarding nodes. That is, an illustrative teleconference controller in accordance with these embodiments may advantageously use other available network nodes to provide "indirect" delivery (i.e., forwarding) of video and/or audio streams, as well as using other (participating) "remote" nodes therefore. Moreover, in accordance with certain illustrative embodiments of the present invention, a video and/or audio stream may be forwarded by a sequence of a plurality of peer-to-peer forwarding nodes. That is, in accordance with these illustrative embodiments of the present invention, a video and/or audio stream may be forwarded from a first peer-to-peer forwarding node to (and through) one or more other peer-to-peer forwarding nodes before being finally received at the desired destination ("remote") node.

Finally, in accordance with certain illustrative embodiments of the present invention, peer-to-peer forwarding nodes may, in addition to forwarding the received video and/or audio streams to other remote nodes, advantageously provide transcoding thereof. (As is well known to those of ordinary skill in the art, transcoding involves the process of taking an encoded video and/or audio signal and re-encoding that video and/or audio signal prior to its subsequent use based on a set of criteria that reflects the particular needs of the subsequent use. For example, in the present context, a video signal which has been initially encoded at a given quality level—e.g., at a given resolution or frame rate—may be re-encoded, or "transcoded", into a video signal having a lower quality level—e.g., at a lower resolution or frame rate—in order to satisfy a need for reduced bandwidth.) For example, in accordance with one illustrative embodiment of the present invention, a remote node which receives a video (and/or audio) signal stream from a source location under the control of an illustrative teleconference controller might also receive instructions from said teleconference controller to transcode the received signal stream in a specified manner (e.g., to a different resolution, to a different color depth, using a different encoding algorithm, to a different frame rate, to meet a different bandwidth requirement, etc.), prior to its forwarding the signal stream to another remote node. Moreover, these instructions may illustratively be provided on an individual (i.e., node by node) basis.

Figure 3:
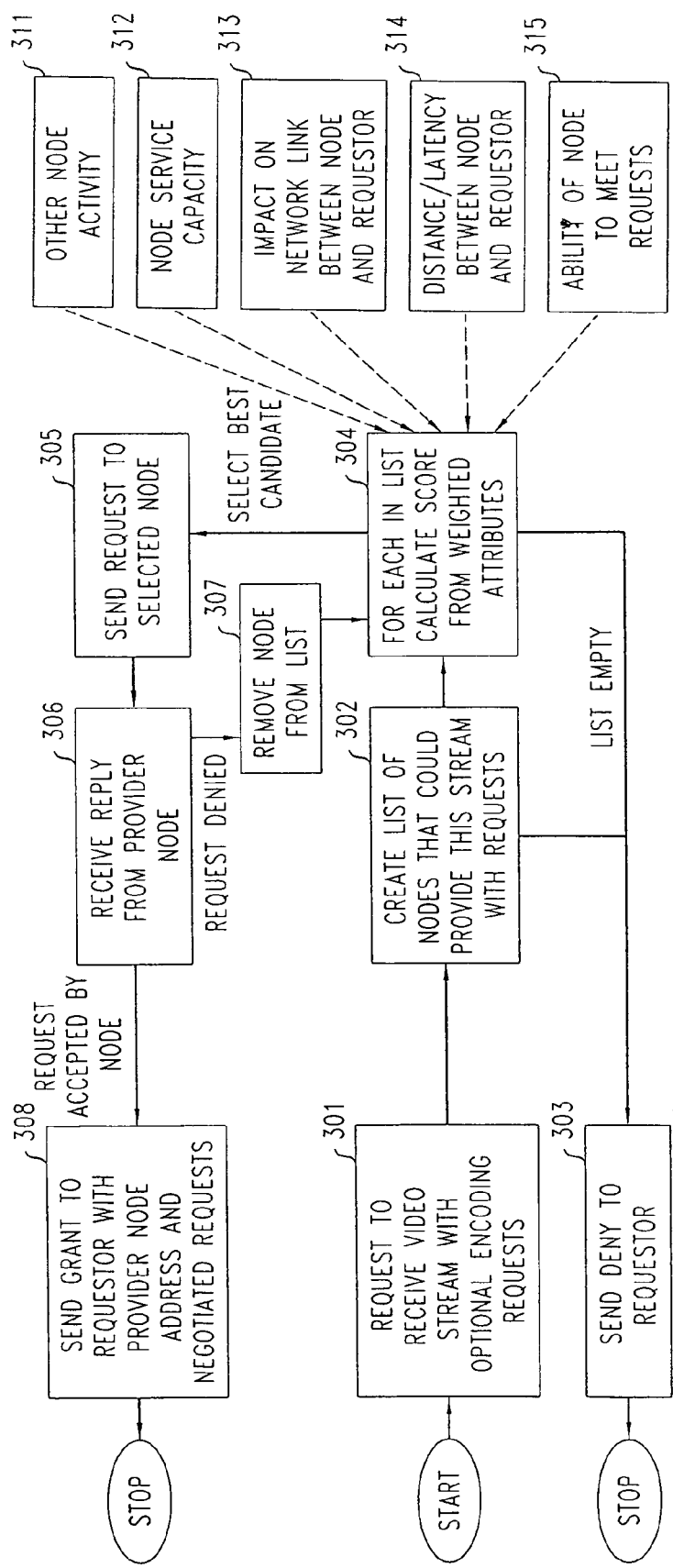
FIG. 3 shows a flowchart of an illustrative method for performing provider node selection which may be employed in the illustrative system for performing video teleconferencing of FIG. 2.

FIG. 3 shows a flowchart of an illustrative method for performing provider node (i.e., peer-to-peer forwarding node) selection which may be employed in the illustrative system for performing video teleconferencing of FIG. 2. The illustrative method of FIG. 3 may be advantageously performed by a teleconference controller in accordance with an illustrative embodiment of the present invention (such as, for example, teleconference controller 204 of the illustrative system of FIG. 2).

In FIG. 2, for example, rather than having the source node in "Room F" 201 send individual video (and/or audio) signal streams to each of the remote nodes located in "Room A" 208, "Room B" 210 and "Room C" 212, teleconference controller 204 of the illustrative system of FIG. 2 advantageously directs that these signal streams be sent only to node B (i.e., the remote node located in "Room B" 210), which then, in accordance with the illustrative embodiment of the present invention, in turn forwards these signal streams to node A (i.e., the remote node located in "Room A" 208) and to node C (i.e., the remote node located in "Room C" 212). Similarly, rather than having the source node in "Room F" 201 send individual video (and/or audio) signal streams to both of the remote nodes located in "Room D" 214 and "Room E" 216, teleconference controller 204 of the illustrative system of FIG. 2 advantageously directs that these signal streams be sent only to node D (i.e., the remote node located in "Room D" 214), which then, in accordance with the illustrative embodiment of the present invention, in turn forwards these signal streams to node E (i.e., the remote node located in "Room E" 216). That is, a teleconference controller in accordance with an illustrative embodiment of the present invention advantageously directs that individual video (and/or audio) signal streams be sent only to a set of selected peer-to-peer forwarding nodes, rather than to all of the nodes participating in the teleconference.

More specifically, the selection of the remote nodes to which the teleconference controller directly has the video and/or audio signal streams sent may be made based on a variety of considerations in accordance with various illustrative embodiments of the present invention. As a minimum, an analysis of the network topology may be advantageously performed so that topologically interconnected (e.g., adjacent or nearby) nodes, for example, may be grouped together such that only a single selected one of such nodes is directly provided with the signal stream (with the others receiving the signal streams from the selected node, using the principles of peer-to-peer network connectivity). Many such known algorithms for analyzing a network's topology will be fully familiar to those of ordinary skill in the art.

However, in accordance with certain illustrative embodiments of the present invention, a teleconference controller may advantageously select peer-to-peer forwarding nodes to be used to deliver video (and/or audio) streams to other remote nodes based on other criteria as well. For example, in accordance with one illustrative embodiment of the present invention, an illustrative teleconference controller may dynamically compute how each participating node is located in the network with regard to IP packet transmission delays between the nodes. For example, such a teleconference controller may take into account either average IP packet transmission delays, maximum IP packet transmission delays, or both: In addition, other attributes including, for example, statistics relating to the processing power of the individual nodes, other activity on the nodes (which may, therefore, impact the available processing power thereof), service capacity of the nodes, etc., may also be taken into account for purposes of selecting peer-to-peer forwarding nodes.

Specifically, in accordance with one illustrative embodiment of the present invention, the individual remote nodes themselves may be advantageously employed to compute and report back to the teleconference controller various information, such as, for example, topological information including their peer-to-peer connectivity, the delay to their peers, and the vital statistics on their processing power. Such a computation may, for example, be performed after system startup (e.g., the initiation of a teleconference) and after each change in the conference configuration (e.g., either on demand changes or involuntary changes which may be detected by continuous network connectivity monitoring). Using this topology and resource information, the illustrative teleconference controller may then advantageously make decisions regarding how the video (and/or audio) streams should be distributed to and from each remote endpoint, including decisions regarding the selection of peer-to-peer forwarding nodes.

Returning to FIG. 3, the flowchart of the operation of the illustrative teleconference controller begins in block 301 with the receipt of a request from a remote node to receive a video stream from the primary meeting room (e.g., "Room F" 201 of FIG. 2) with optional transcoding requirements. (See the discussion of optional transcoding, as performed in accordance with certain illustrative embodiments of the present invention, above). In particular, this remote node may be requesting that the teleconference controller identify another (nearby) remote node which will serve as a peer-to-peer forwarding node. Next, based on the teleconference controller's knowledge of the network topology (which may, for example, have been obtained from a consolidation of reports from the individual remote nodes as described above), a list of nodes that may be able to serve as peer-to-peer forwarding nodes and that could provide this video stream to the remote node which is requesting it (with any transcoding requests) is generated in block 302. If this list is empty, a denial is sent back to the requesting remote node in block 303.

Otherwise, for each node in the generated list, an overall score is advantageously calculated in block 304, wherein the score is based on a set of available parameters, and wherein the score indicates the overall degree of suitability of the given node to serve as a peer-to-peer forwarding node for the remote node requesting the video stream. These parameters may, for example, include:

(i) other activity on the given node (as shown in block 311);

(ii) the service capacity of the given node (as shown in block 312);

(iii) the impact on the network link between the given node and the remote node requesting the video stream (as shown in block 313);

(iv) the distance and/or latency between the given node and the remote node requesting the video stream (as shown in block 314); and (v) the ability of the given node to meet the encoding requests, if any (as shown in block 315).

In addition, various other parameters, many of which will be obvious to those of ordinary skill in the art, may also be included in the calculation of the overall score. Moreover, the overall score may be calculated based on these parameters in any of a myriad of ways, many of which will also be obvious to those of ordinary skill in the art.

Based on the calculated score, the illustrative teleconference controller advantageously selects the best candidate (e.g., the node with the highest score) in block 304 of the illustrative flowchart, and then, in block 305 sends a request to the selected node that it serve as a peer-to-peer forwarding node for the given remote node requesting the video stream. Then, in block 306, a reply is received from the selected node. If the request to serve as a peer-to-peer forwarding node for the given remote node requesting the video stream is denied by the selected node, then, in block 307, that node is removed from the list (as generated in block 302—see above). In this case, flow returns to block 304 to select the next best candidate (again, based on the calculated scores). If, however, the list is determined (in block 304) to now be empty, a denial is sent back to the requesting remote node in block 303 (see above). Otherwise (i.e., if the selected node accepts the request to serve as a peer-to-peer forwarding node for the remote node requesting the video stream), the teleconference controller grants the request of the remote node (which is requesting the video stream) in block 308, by providing to it the node address of the node which will serve as the peer-to-peer forwarding node along with the details of any negotiated transcoding requests.

Although the above description focuses on the use of the described illustrative embodiments in typical (video and/or audio) teleconferencing applications, numerous other applications can advantageously make use of the principles of the present invention, and doing so will be obvious to those of ordinary skill in the art. For example, applications such as gaming, social networks, video chat rooms, etc. may all make advantageous use of the principles of the present invention in accordance with various illustrative embodiments thereof.

Finally, although the above figures show (and the discussions thereof describe) illustrative embodiments of the present invention implemented in typical "wired" telecommunications networks such as, for example, the Internet, the principles of the present invention and various illustrative embodiments thereof are equally applicable to and may be implemented in wireless networks or networks consisting of any combination of wired and wireless interconnections between network nodes, routers and/or other network components.

Addendum to the Detailed Description

It should be noted that all of the preceding discussion merely illustrates the general principles of the invention. It will be appreciated that those skilled in the art will be able to devise various other arrangements, which, although not explicitly described or shown herein, embody the principles of the invention, and are included within its spirit and scope. In addition, all examples and conditional language recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. It is also intended that such equivalents include both currently known equivalents as well as equivalents developed in the future— i.e., any elements developed that perform the same function, regardless of structure.

What is claimed is:

1. A method for controlling the operation of a teleconference across a telecommunications network comprising a plurality of nodes including one or more source locations and one or more remote locations, the teleconference including teleconference participants at each of said one or more source locations and at each of said one or more remote locations, the method performed by a teleconference controller, the method comprising:

receiving, at the teleconference controller, a request from a first one of said remote locations to deliver a media signal from a first one of said source locations to said first one of said remote locations;

automatically selecting, at the teleconference controller, a second one of said remote locations to serve as a peer-to-peer forwarding node for said delivery of said media signal from said first one of said source locations to said first one of said remote locations; and initiating, by the teleconference controller, a transmission of said media signal from said first one of said source locations to said selected second one of said remote locations, said media signal for use by teleconference participants located at said second one of said remote locations and for further use by said selected second one of said remote locations in forwarding said media signal to said first one of said remote locations.

2. The method of claim 1 wherein said media signal comprises an audio signal.

3. The method of claim 1 wherein said media signal comprises a video signal.

4. The method of claim 3 wherein said request received from said first one of said remote locations includes a request that said video signal be transcoded prior to said delivery to said first one of said remote locations, and wherein said step of automatically selecting said second one of said remote locations further selects said second one of said remote locations to perform said transcoding of said video signal prior to said forwarding of said video signal to said first one of said remote locations.

5. The method of claim 4 wherein said request that said video signal be transcoded prior to said delivery to said first one of said remote locations includes a request for one or more of: a change in resolution; a change in color depth; a use of a different encoding algorithm; a change in frame rate; and a change to meet a different bandwidth requirement.

6. The method of claim 1 wherein said automatically selecting said second one of said remote locations to serve as a peer-to-peer forwarding node for said delivery of said media signal from said first one of said source locations to said first one of said remote locations is based on one or more of: a topological location within the telecommunications network of one or more of said plurality of remote locations; average packet delays between nodes in the telecommunications network; maximum packet delays between nodes in the telecommunications network; processing power of nodes in the telecommunications network; other activity levels of nodes in the telecommunications network; and service capacity of nodes in the telecommunications network.

7. The method of claim 1 further comprising:

receiving, at the teleconference controller, information from one or more of said plurality of remote locations, wherein said automatically selecting said second one of said remote locations to serve as a peer-to-peer forwarding node for said delivery of said media signal from said first one of said source locations to said first one of said remote locations is based on said information received from said one or more of said plurality of remote locations.

8. The method of claim 7 wherein said information received from a given one of said remote locations includes one or more of: topological information relating to peer-to-peer connectivity between the given one of said remote locations and one or more other remote locations; one or more packet delay times between the given one of said remote locations and one or more other remote locations; and processing power associated with the given one of said remote locations.

9. The method of claim 1 wherein said automatically selecting said second one of said remote locations to serve as a peer-to-peer forwarding node for said delivery of said media signal from said first one of said source locations to said first one of said remote locations comprises:
generating a list of one or more of said plurality of remote locations which could serve as a peer-to-peer forwarding node for said delivery of said media signal from said first one of said source locations to said first one of said remote locations;
assigning a score to each of said remote locations in said list; and
selecting one of said remote locations in said list to serve as a peer-to-peer forwarding node for said delivery of said media signal from said first one of said source locations to said first one of said remote locations based on the scores assigned thereto.

10. The method of claim 1 further comprising:
receiving, at the teleconference controller, a request from said first one of said remote locations to further deliver a media signal from a second one of said source locations to said first one of said remote locations; and
initiating, by the teleconference controller, a transmission of said media signal from said second one of said source locations to said selected second one of said remote locations, said media signal for use by teleconference participants located at said second one of said remote locations and for further use by said selected second one of said remote locations in forwarding said media signal to said first one of said remote locations,
wherein said automatically selecting the second one of said remote locations to serve as a peer-to-peer forwarding node for said delivery of said media signal from said first one of said source locations to said first one of said remote locations further selects the second one of said remote locations to serve as a peer-to-peer forwarding node for said delivery of said media signal from said second one of said source locations to said first one of said remote locations.

11. The method of claim 10 wherein said media signal from said first one of said source locations and said media signal from said second one of said source locations are combined together prior to being forwarded to said first one of said remote locations.

12. The method of claim 11 wherein said media signal from said first one of said source locations and said media signal from said second one of said source locations are combined together at the teleconference controller.

13. A teleconference controller for controlling the operation of a teleconference across a telecommunications network comprising a plurality of nodes including one or more source locations and one or more remote locations, the teleconference including teleconference participants at each of said one or more source locations and at each of said one or more remote locations, the teleconference controller comprising:
a receiver, which receives a request from a first one of said remote locations to deliver a media signal from a first one of said source locations to said first one of said remote locations; and
an automatic selection module, which automatically selects a second one of said remote locations to serve as a peer-to-peer forwarding node for said delivery of said media signal from said first one of said source locations to said first one of said remote locations, and which initiates a transmission of said media signal from said first one of said source locations to said selected second one of said remote locations, said media signal for use by teleconference participants located at said second one of said remote locations and for further use by said selected second one of said remote locations in forwarding said media signal to said first one of said remote locations.

14. The teleconference controller of claim 13 wherein said media signal comprises an audio signal.

15. The teleconference controller of claim 13 wherein said media signal comprises a video signal.

16. The teleconference controller of claim 15 wherein said request received from said first one of said remote locations includes a request that said video signal be transcoded prior to said delivery to said first one of said remote locations, and wherein said automatic selection module further selects said second one of said remote locations to perform said transcoding of said video signal prior to said forwarding of said video signal to said first one of said remote locations.

17. The teleconference controller of claim 13 wherein the receiver further receives information from one or more of said plurality of remote locations, and wherein said automatic selection module selects said second one of said remote locations to serve as a peer-to-peer forwarding node for said delivery of said media signal from said first one of said source locations to said first one of said remote locations based on said information received from said one or more of said plurality of remote locations.

18. The teleconference controller of claim 13 wherein said automatic selection module comprises:
a list generator, which generates a list of one or more of said plurality of remote locations which could serve as a peer-to-peer forwarding node for said delivery of said media signal from said first one of said source locations to said first one of said remote locations; and
a score generator, which assigns a score to each of said remote locations in said list, wherein said automatic selection module selects one of said remote locations in said list to serve as a peer-to-peer forwarding node for said delivery of said media signal from said first one of said source locations to said first one of said remote locations based on the scores assigned thereto.

19. The teleconference controller of claim 13 further comprising a media signal combiner which combines the media signal from the first one of said source locations with a media signal from a second one of said source locations prior to being forwarded to said first one of said remote locations.

* * * * *